(12) United States Patent  
Yoshida et al.

(10) Patent No.: US 7,829,220 B2  
(45) Date of Patent: Nov. 9, 2010

(54) HYDROGEN STORAGE ALLOY FOR ALKALINE BATTERY AND PRODUCTION METHOD THEREOF, AS WELL AS ALKALINE BATTERY

(75) Inventors: Shuhei Yoshida, Moriguchi (JP);  
Kazuaki Tamura, Moriguchi (JP);  
Yoshinobu Katayama, Moriguchi (JP);  
Teruhito Nagae, Moriguchi (JP); Masao Takee, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 315 days.

(21) Appl. No.: 12/128,968

(22) Filed: May 29, 2008

(65) Prior Publication Data

US 2008/0299458 A1    Dec. 4, 2008

(30) Foreign Application Priority Data

May 30, 2007    (JP)    ............................ 2007-143059

(51) Int. Cl.  
*H01M 4/58*    (2010.01)  
*C01B 6/24*    (2006.01)

(52) U.S. Cl. .................................. 429/218.2; 423/644

(58) Field of Classification Search ............... 429/218.2  
See application file for complete search history.

(56) References Cited

U.S. PATENT DOCUMENTS

2006/0254678 A1* 11/2006 Sakai et al. ................. 148/426

FOREIGN PATENT DOCUMENTS

JP    62-31947 A    2/1987  
JP    2002-164045 A    6/2002

* cited by examiner

*Primary Examiner*—Patrick Ryan  
*Assistant Examiner*—Brent Thomas  
(74) *Attorney, Agent, or Firm*—Westerman, Hattori, Daniels & Adrian, LLP

(57) ABSTRACT

To provide a hydrogen storage alloy for an alkaline battery capable of having high performance of power characteristics much more beyond the related-art range, and a production method thereof, as well as an alkaline battery by investigating the constituent ratios of the $A_2B_7$-type structure and the $A_5B_{19}$-type structure.

The hydrogen storage alloy for an alkaline battery of the present invention includes: an element R selected from the Group IV and the rare earth elements including Y and excluding La; and an element M consisting of at least one of Co, Mn, and Zn. The hydrogen storage alloy is represented by general formula: $La_\alpha R_{1-\alpha-\beta}Mg_\beta Ni_{\gamma-\eta-\epsilon}Al_\eta M_\epsilon$ (wherein $\alpha$, $\beta$, $\gamma$, $\eta$, $\epsilon$ satisfy numerical formulae: $0 \leq \alpha \leq 0.5$, $0.1 \leq \beta \leq 0.2$, $3.7 \leq \gamma \leq 3.9$, $0.1 \leq \eta \leq 0.3$, $0 \leq \epsilon \leq 0.2$); and the constituent ratio of the $A_5B_{19}$-type structure is 40% or more in the crystal structure thereof.

8 Claims, 3 Drawing Sheets

\# HYDROGEN STORAGE ALLOY FOR ALKALINE BATTERY AND PRODUCTION METHOD THEREOF, AS WELL AS ALKALINE BATTERY

TECHNICAL FIELD

The present invention relates to a hydrogen storage alloy for an alkaline battery suitable for an application requiring a large current discharge, such as a hybrid electric vehicle (HEV) and a pure electric vehicle (PEV), and a production method thereof, as well as an alkaline battery.

BACKGROUND ART

Recently, as a power source for equipment requiring a high performance of power characteristics such as the hybrid electric vehicle (HEV) or the pure electric vehicle (PEV), an alkaline battery, particularly a nickel-hydrogen battery has been used. Generally, as the hydrogen storage alloy used for a negative electrode of a nickel-hydrogen battery, a hydrogen storage alloy produced by substituting a part of an $AB_5$ rare earth hydrogen storage alloy such as $LaNi_5$ with an element such as aluminum (Al) and manganese (Mn) is used. Since the $AB_5$-type hydrogen storage alloy contains aluminum (Al) or manganese (Mn) having a low melting point, it is known that in the alloy, a segregation phase such as an aluminum-rich phase or a manganese-rich phase is likely to be formed in a grain boundary or on the surface thereof.

When the charge-discharge cycle is repeated, by the expansion or contraction of the crystal lattice of a hydrogen storage alloy, within the crystal of a hydrogen storage alloy, a large internal stress is generated. By such a large internal stress, the hydrogen storage alloy is pulverized or by the dissolution of aluminum (Al) or manganese (Mn) out of a formed segregation phase, the intergranular corrosion of the hydrogen storage alloy is caused, which gives rise to problems with the corrosion resistance of the hydrogen storage alloy. A method for causing the hydrogen storage alloy to consist of a monophase without forming a segregation phase by subjecting the hydrogen storage alloy to a thermal treatment has been variously investigated, for example in JP-A-Sho 62-31947.

However, in the procedure proposed in JP-A-Sho 62-31947, there was the following drawback. That is, when the hydrogen storage alloy is caused to consist of a monophase by subjecting it to a thermal treatment, there is no segregation interface, so that the area of the alloy contacted with an alkali electrolyte liquid decreases, so that the initial activation performance of the battery is lowered. Therefore, there was also the problem that satisfactory charge-discharge properties and satisfactory cycle life properties for the application of the hybrid electric vehicle (HEV) and pure electric vehicle (PEV) requiring power characteristics much more beyond the related-art range, cannot be obtained.

Normally, a general hydrogen storage alloy has the above-described $AB_5$-type structure or $AB_2$-type structure. However, it is known that by combining the $AB_2$-type structure and the $AB_5$-type structure, the hydrogen storage alloy takes various crystal structures. Among them, a hydrogen storage alloy in a $Ce_2Ni_7$-type structure in which the $AB_2$-type structure and the $AB_5$-type structure are superimposed on each other with a cycle of two layers has been variously investigated, for example in JP-A-2002-164045. The hydrogen storage alloy in the $Ce_2Ni_7$-type structure has a crystal structure of a hexagonal 2H form and can improve cycle life characteristics.

However, there was the problem that the hydrogen storage alloy in the above-described $Ce_2Ni_7$-type structure proposed in JP-A-2002-164045 has unsatisfactory discharge characteristics (assist power) and lacks satisfactory performance for the application of high power much beyond the related-art range. Here, a hydrogen storage alloy consisting of a rare earth element, nickel and magnesium take various crystal structures in a combination of the $AB_2$-type structure and the $AB_5$-type structure and consists of besides the $AB_2$-type structure and the $AB_5$-type structure, the $A_2B_7$-type structure, the $A_5B_{19}$-type structure which are a metastable phase.

These component ratios are greatly vary depending on the stoichiometric ratio of the hydrogen storage alloy. For example, in a stoichiometric ratio region higher than a related-art region, the ratio of nickel is high, so that the melting point amplitude becomes large during the metal dissolution. Therefore, it is known that aluminum and magnesium segregate, so that aluminum forms a segregation phase of a $AB_5$-type structure and magnesium forms a segregation phase of a $AB_2$-type structure, which leads to degradation of alloy corrosion resistance. However, the battery properties resulting from the component ratio of the $A_2B_7$-type structure and $A_5B_{19}$-type structure, which are a metastable phase, were not clear.

SUMMARY OF INVENTION

Thus, the present invention has been completed for solving the above problem and the object of the present invention is to provide a hydrogen storage alloy for an alkaline battery capable of having high performance of power characteristics much beyond the related-art range, and a production method thereof, as well as an alkaline battery by investigating the component ratios of the $A_2B_7$-type structure and the $A_5B_{19}$-type structure.

For achieving the above object, the hydrogen storage alloy for an alkaline battery of the present invention which is used as a negative electrode active material of an alkaline battery includes: an element R selected from the Group IV and the rare earth elements including Y and excluding La; and an element M consisting of at least one of Co, Mn, and Zn. The hydrogen storage alloy is represented by general formula: $La_\alpha R_{1-\alpha-\beta} Mg_\beta Ni_{\gamma-\eta-\epsilon} Al_\eta M_\epsilon$ (wherein $\alpha$, $\beta$, $\gamma$, $\eta$, $\epsilon$ satisfy numerical formulae: $0 \leq \alpha \leq 0.5$, $0.1 \leq \beta \leq 0.2$, $3.7 \leq \gamma \leq 3.9$, $0.1 \leq \eta \leq 0.3$, $0 \leq \epsilon \leq 0.2$); and the component ratio of the $A_5B_{19}$-type structure is 40% or more in the crystal structure thereof.

The present inventors have made extensive and intensive studies and as the result, not only such a finding that when in the crystal structure of a hydrogen storage alloy in a stoichiometric ratio region higher than the related-art one (the region of $3.7 \leq \gamma \leq 3.9$), the $A_5B_{19}$-type structure is present in a component ratio of 40% or more, specific discharge characteristics can be obtained, has been obtained, but also it has been found that discharge characteristics (assist power) can be improved. Here, the $A_5B_{19}$ structure has a smaller lattice volume than that of the $A_2B_7$-type structure. Therefore, the $A_5B_{19}$-type structure can take a structure having a higher nickel ratio, so that it is considered that the active site thereof becomes enlarged and the discharge characteristics (assist power) can be improved. In this case, the $A_5B_{19}$-type structure is necessary to be constituted with at least of a crystal phase $Ce_5Co_{19}$ and a crystal phase $Pr_5Co_{19}$.

At this time, when the hydrogen content H/M (atomic ratio) of a hydrogen storage alloy at 40° C. is 0.5, it is desired that the equilibrium hydrogen pressure (Pa) is 0.04 MPa to 0.18 MPa. This is because, when the equilibrium hydrogen pressure is higher than 0.18 MPa, the hydrogen concentration on the surface of the hydrogen storage alloy becomes high, which contributes to a reduction reaction in the positive electrode, so that in the application in which the battery is left in a high temperature environment for a long period, such as a battery for the hybrid electric vehicle or pure electric vehicle, the degradation of the capacity of the battery by a self-discharge becomes marked. On the other hand, the above desired range is because, when the equilibrium hydrogen pressure is lower than 0.04 MPa, by the lowering of the operating voltage, the power characteristics are lowered.

For producing the hydrogen storage alloy having the above-described constitution, it desired that such an alloy is produced by a method including: heating and melting a raw material having a composition represented by a general formula: $La_\alpha R_{1-\alpha-\beta} Mg_\beta Ni_{\gamma-\eta-\epsilon} Al_\eta M_\epsilon$ (wherein $\alpha$, $\beta$, $\gamma$, $\eta$, $\epsilon$ satisfy numerical formula: $0 \leq \alpha \leq 0.5$, $0.1 \leq \beta \leq 0.2$, $3.7 \leq \gamma \leq 3.9$, $0.1 \leq \eta \leq 0.3$, $0 \leq \epsilon \leq 0.2$) and containing an element R selected from the Group IV and the rare earth elements including Y and excluding La, and an element M consisting of at least one of Co, Mn, and Zn, to prepare a molten metal; producing an alloy ingot having a thickness of 0.5 mm or less from the molten metal; and heat treating the alloy ingot at a specific temperature.

Here, in an alloy ingot (flake) having a thickness of 0.5 mm or less of the hydrogen storage alloy represented by the above general formula, it has become apparent that the constituent ratio of the $A_5B_{19}$-type structure becomes large such as 40% or more and the power characteristics (assist power) are improved. It is considered that this is because, when the thickness of the alloy ingot of the hydrogen storage alloy becomes smaller (thinner), the cooling speed into the inside of the alloy ingot can be accelerated, so that the $A_5B_{19}$-type structure as a metastable phase has become able to be easily homogeneously formed. Thus, for causing the constituent ratio of the $A_5B_{19}$-type structure to be large such as 40% or more, it is not possible in a related-art stoichiometric ratio region such as $\gamma$ of around 3.5, but possible only in the stoichiometric ratio region (region: $3.7' \leq \gamma \leq 3.9$) according to the present invention.

Here, the temperature for the heat treatment to which the produced alloy ingot is subjected is desirably a temperature lower than the melting point of the alloy ingot by 60° C. to 30° C. This is because, when the hydrogen storage alloy is subjected to a heat treatment at a temperature lower than a temperature which is lower than the melting point of the alloy ingot by 60° C., a segregation phase is generated by an inhomogeneous dispersion of Al or Mg and the homogenization of the structure is hindered, which becomes a cause to lead to the lowering of corrosion resistance of the alloy, and on the other hand when the hydrogen storage alloy is subjected to a heat treatment at a temperature higher than a temperature which is lower than the melting point of the alloy ingot by 30° C., a Mg fume is generated because of a low melting point of Mg, so that a problem concerning the safety during the alloy production is caused.

In the hydrogen storage alloy according to the present invention in a higher stoichiometric ratio region (region: $3.7 \leq \gamma \leq 3.9$) than a related-art stoichiometric ratio region, the constituent ratio of the $A_5B_{19}$-type structure in the crystal structure is caused to be 40% or more, so that the hydrogen storage alloy becomes able to have power characteristics (assist power) much more beyond the related-art range.

DESCRIPTION OF EXEMPLARY EMBODIMENTS

Figure 1:
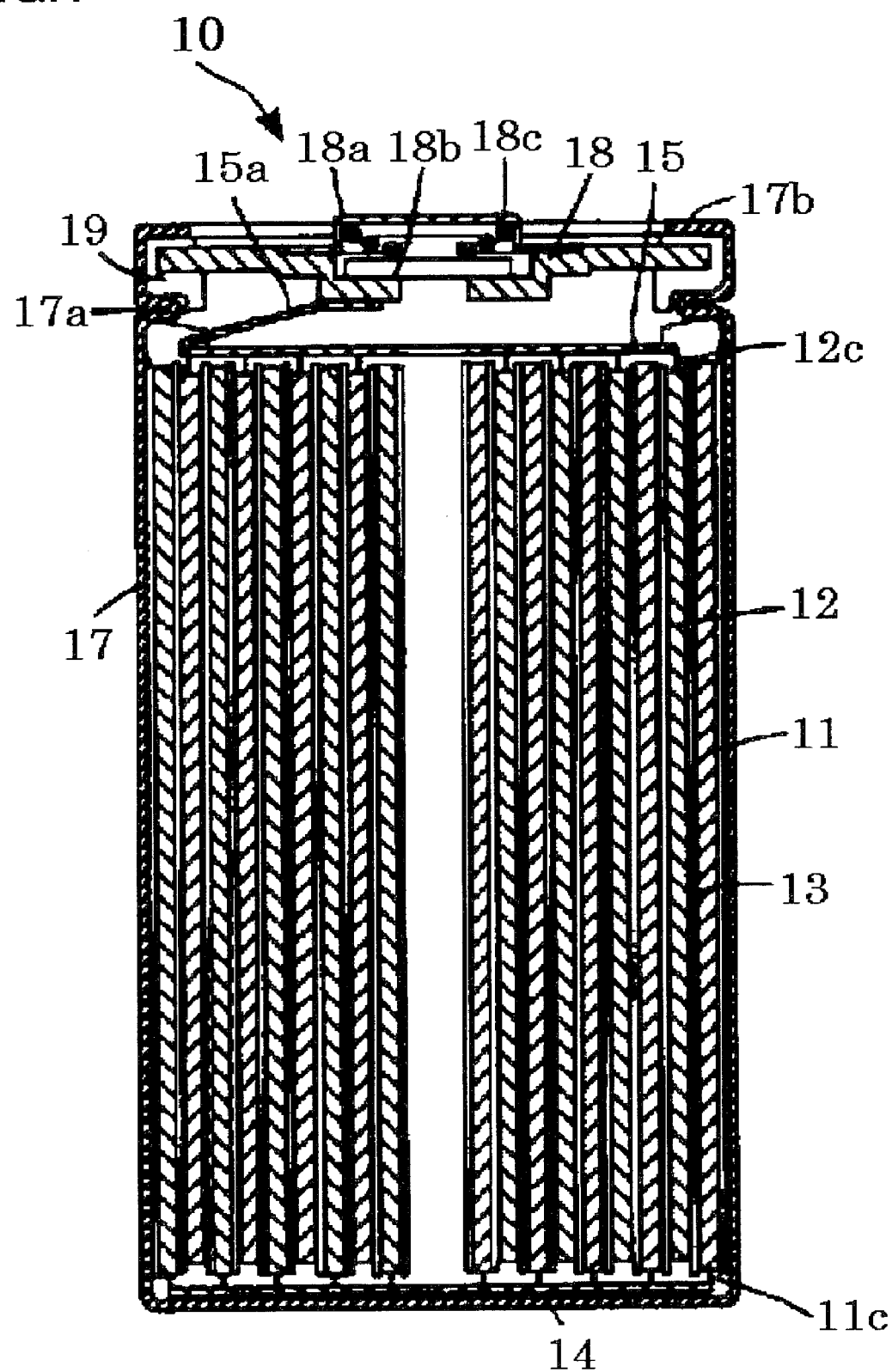
FIG. 1 is a cross sectional view schematically showing the alkaline battery of the present invention.
Figure 2:
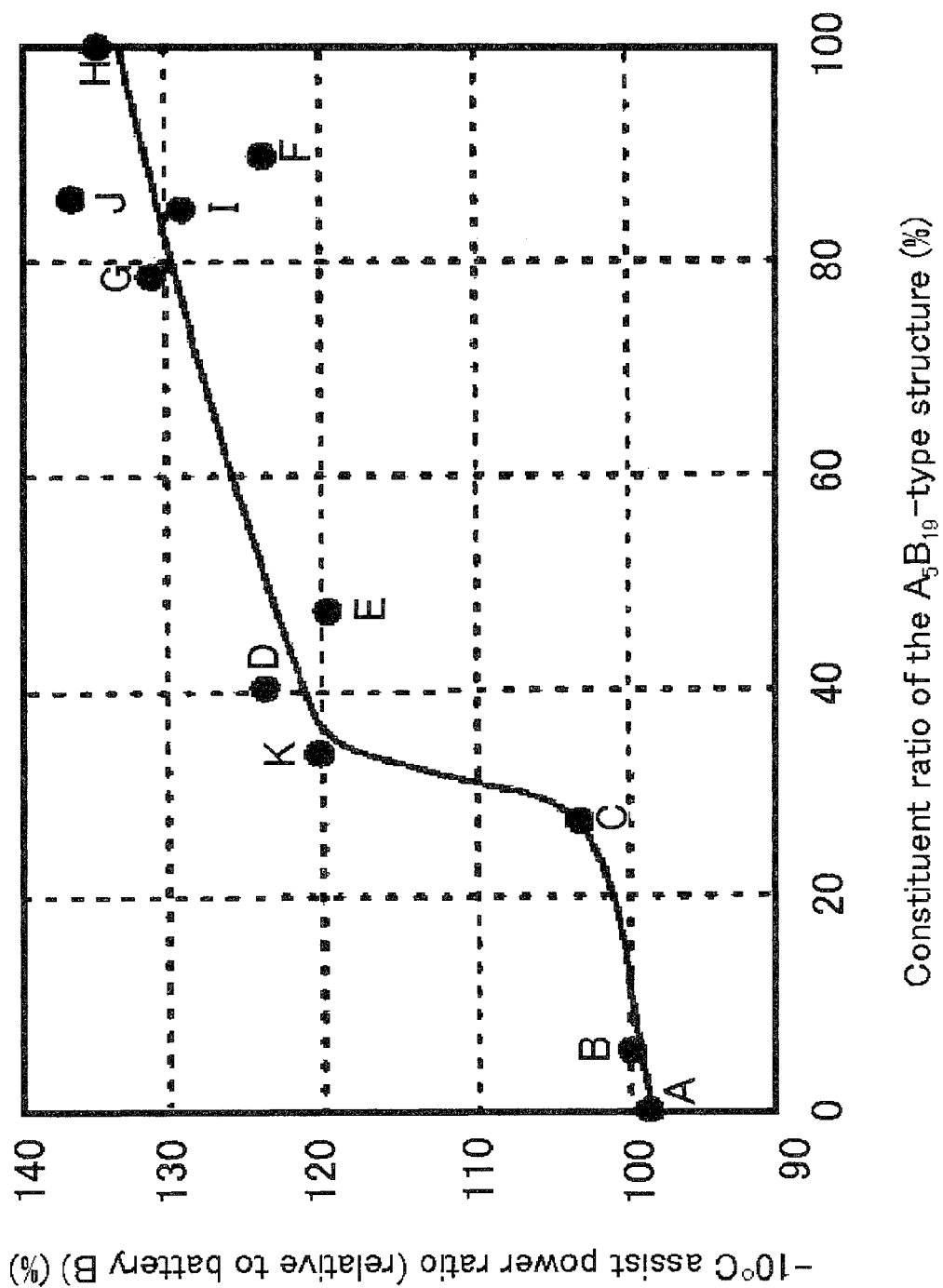
FIG. 2 is a graph showing a relationship between the constituent ratio (%) of the $A_5B_{19}$-type structure and −10° C. assist power ratio (relative to battery B) (%).
Figure 3:
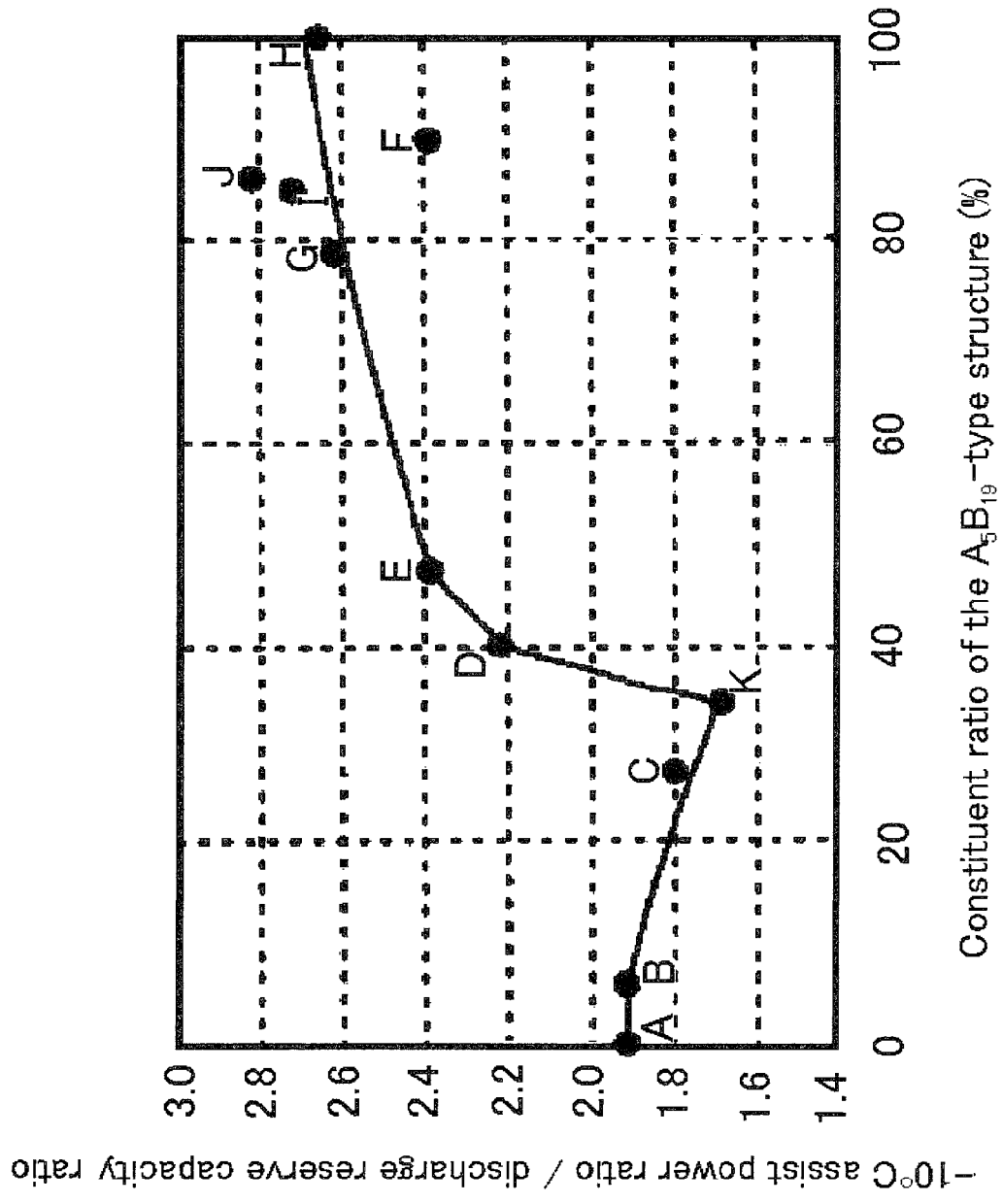
FIG. 3 is a graph showing a relationship between the constituent ratio (%) of the $A_5B_{19}$-type structure and −10° C. assist power ratio/discharge reserve capacity ratio.

Next, the embodiments of the present invention are more specifically described referring to the following FIGS. 1 to 3, which should not be construed as limiting the scope of the present invention. The present invention can be embodied by changing appropriately as long as the gist of the present invention is not changed. Here, FIG. 1 is a schematic cross sectional view showing the alkaline battery of the present invention. FIG. 2 is a graph showing the relationship between the constituent ratio (%) of the $A_5B_{19}$-type structure and the −10° C. assist power ratio (%) (relative to the battery B). FIG. 3 is a graph showing the relationship between the constituent ratio (%) of the $A_5B_{19}$-type structure and the −10° C. assist power ratio (%)/discharge reserve capacity ratio.

1. Hydrogen Storage Alloy

Metal elements such as La, Ce, Pr, Nd, Mg, Ni, Al, Co, Mn, Zn were mixed so that a molar ratio of each metal element becomes a specific molar ratio shown in the following Table 1 and thereafter, the resultant mixture was charged into a high-frequency electric induction furnace of an argon gas atmosphere to dissolve the mixture. Thereafter, the resultant molten metal was quenched to form an alloy ingot having a thickness of 0.5 mm or less to thereby produce thin plate-shaped hydrogen storage alloys a to k. In this case, a hydrogen storage alloy represented by a composition formula: $La_{0.8}Ce_{0.1}Pr_{0.05}Nd0.05Ni_{4.2}Al_{0.3}(Co, Mn)_{0.7}$ was referred to as the hydrogen storage alloy a, that represented by a composition formula: $Nd_{0.9}Mg_{0.1}Ni_{3.2}Al_{0.2}Co_{0.1}$ was referred to as the hydrogen storage alloy b, and that represented by a composition formula: $La_{0.2}Pr_{0.2}Nd_{0.5}Mg_{0.1}Ni_{3.4}Al_{0.2}$ was referred to as the hydrogen storage alloy c.

Further, that represented by a composition formula: $Nd_{0.9}Mg_{0.1}Ni_{3.4}Al_{0.2}(Co, Mn)_{0.1}$ was referred to as the hydrogen storage alloy d, that represented by a composition formula: $Nd_{0.9}Mg_{0.1}Ni_{3.5}Al_{0.2}$ was referred to as the hydrogen storage alloy e, and that represented by a composition formula: $La_{0.2}Pr_{0.1}Nd_{0.5}Mg_{0.2}Ni_{3.5}Al_{0.3}$ was referred to as the hydrogen storage alloy f. Further, that represented by a composition formula: $La_{0.2}Nd_{0.7}Mg_{0.1}Ni_{3.6}Al_{0.1}Zn_{0.2}$ was referred to as the hydrogen storage alloy g, that represented by a composition formula: $La_{0.2}Nd_{0.7}Mg_{0.1}Ni_{3.7}Al_{0.1}$ was referred to as the hydrogen storage alloy h, that represented by a composition formula: $La_{0.5}Pr_{0.1}Nd_{0.3}Mg_{0.1}Ni_{3.7}Al_{0.2}$ was referred to as the hydrogen storage alloy i, that represented by a composition formula: $La_{0.2}Nd_{0.7}Mg_{0.1}Ni_{3.7}Al_{0.1}$ was referred to as the hydrogen storage alloy j. Further, that represented by a composition formula: $La_{0.2}Nd_{0.7}Mg_{0.1}Ni_{3.8}Al_{0.1}Co_{0.1}$ was referred to as the hydrogen storage alloy k. The results of the above descriptions were summarized in a table to be the result shown in the following Table 1.

Here, in the following Table 1, the values of $\alpha$, $\beta$, $\eta$, $\epsilon$ and $\gamma$ when each of the hydrogen storage alloys a to k is represented by a general formula: $La_\alpha R_{1-\alpha-\beta} Mg_\beta Ni_{\gamma-\eta-\epsilon} Al_\eta M_\epsilon$ (wherein, R is an element selected from the Group IV and the rare earth elements including Y and excluding La; and M is an element consisting of at least one of Co, Mn, and Zn) are shown. Here, as described later, $\gamma$ represents the total amount of the B component when $La_\alpha R_{1-\alpha-\beta} Mg_\beta Ni_{\gamma-\eta-\epsilon} Al_\eta M_\epsilon$ is represented by the A component (La, R, Mg) and the B component (Ni, Al, M) and becomes also represent the AB ratio, because the A component becomes 1.

TABLE 1

| Type of alloy | Composition of Hydrogen storage alloy $La_\alpha R_{1-\alpha-\beta} Mg_\beta Ni_{\gamma-\eta-\epsilon} Al_\eta M_\epsilon$ | La $\alpha$ | Mg $\beta$ | Al $\eta$ | M $\epsilon$ | AB ratio $\gamma$ |
|---|---|---|---|---|---|---|
| a | $La_{0.8}Ce_{0.1}Pr_{0.05}Nd_{0.05}Ni_{4.2}Al_{0.3}(Co, Mn)_{0.7}$ | 0 | 0 | 0.3 | 0.7 | 5.2 |
| b | $Nd_{0.9}Mg_{0.1}Ni_{3.2}Al_{0.2}Co_{0.1}$ | 0 | 0.1 | 0.2 | 0.1 | 3.5 |
| c | $La_{0.2}Pr_{0.2}Nd_{0.5}Mg_{0.1}Ni_{3.4}Al_{0.2}$ | 0.2 | 0.1 | 0.2 | 0 | 3.6 |
| d | $Nd_{0.9}Mg_{0.1}Ni_{3.4}Al_{0.2}(Co, Mn)_{0.1}$ | 0 | 0.1 | 0.2 | 0.1 | 3.7 |
| e | $Nd_{0.9}Mg_{0.1}Ni_{3.5}Al_{0.2}$ | 0 | 0.1 | 0.2 | 0 | 3.7 |
| f | $La_{0.2}Pr_{0.1}Nd_{0.5}Mg_{0.2}Ni_{3.5}Al_{0.3}$ | 0.2 | 0.2 | 0.3 | 0 | 3.8 |
| g | $La_{0.2}Nd_{0.7}Mg_{0.1}Ni_{3.6}Al_{0.1}Zn_{0.2}$ | 0.2 | 0.1 | 0.1 | 0.2 | 3.8 |
| h | $La_{0.2}Nd_{0.7}Mg_{0.1}Ni_{3.7}Al_{0.1}$ | 0.2 | 0.1 | 0.1 | 0 | 3.8 |
| i | $La_{0.5}Pr_{0.1}Nd_{0.3}Mg_{0.1}Ni_{3.7}Al_{0.2}$ | 0.5 | 0.1 | 0.2 | 0 | 3.9 |
| j | $La_{0.2}Nd_{0.7}Mg_{0.1}Ni_{3.7}Al_{0.1}$ | 0.2 | 0.1 | 0.1 | 0 | 3.8 |
| k | $La_{0.2}Nd_{0.7}Mg_{0.1}Ni_{3.8}Al_{0.1}Co_{0.1}$ | 0.2 | 0.1 | 0.1 | 0.1 | 4.0 |

Next, with respect to each of the obtained hydrogen storage alloys a to k, the melting point (Tm) was measured by using a DSC (Differential Scanning Calorimeter). Thereafter, at a temperature lower than each of the melting points (Tm) of the hydrogen storage alloys a to k (Ta=Tm−30° C.), the alloy was subjected to a thermal treatment for a specific time (in this case, 12 hours). Then, the equilibrium hydrogen pressure (MPa) of each of the hydrogen storage alloys a to k after the thermal treatment was measured and the result of the measurement is the result shown in FIG. 2. In this case, the equilibrium hydrogen pressure (MPa) was measured as a dissociation pressure when the amount of hydrogen content (H/M) is 0.5 in an atmosphere of 40° C. according to JIS H7201 (1991) "Method for measuring Pressure-Composition-Temperature isotherm (PCT curve) of hydrogen storage alloy".

Thereafter, a block of each of the hydrogen storage alloys a to k was coarsely ground and then, was mechanically ground in an inert gas atmosphere to an average particle diameter of 25 μm to thereby produce the hydrogen storage alloy particles a to k. Next, the crystal structure of the hydrogen storage alloy particles a to k was identified according to a powder X-ray diffractometry using an X-ray diffractometry apparatus having a Cu-Kα tube as an X-ray source. In this case, the X-ray diffractometry was performed under the conditions: scan speed of 1'/min, tube voltage of 40 kV, tube current of 300 mA, scan step of 1°, and measuring angle (2θ) of 20 to 50°. From the obtained XRD profile, the crystal structure of each of the hydrogen storage alloys a to k was identified by using the JCPDS card chart.

Here, the constituent ratio of each crystal structure was measured in such a manner that the constituent ratio of the $A_5B_{19}$-type structure was measured as those of the $Ce_5Co_{19}$-type structure, the $Pr_5Co_{19}$-type structure and the total thereof, the constituent ratio of the $A_2B_7$-type structure was measured as those of the $Nd_2Ni_7$-type structure, the $Ce_2Ni_7$-type structure and the total thereof, and the constituent ratio of the $AB_5$-type structure was measured as that of the $LaNi_5$-type structure, by a method of applying the intensity value ratio of the intensity value of the diffraction angle of each structure calculated from the JCPDS to the largest intensity value in the range of 42° to 44°, to the obtained XRD profile. As the measured constituent ratio of each structure, the results shown in Table 2 were obtained.

TABLE 2

| Type of alloy | Composition of hydrogen storage alloy $La_\alpha R_{1-\alpha-\beta} Mg_\beta Ni_{\gamma-\eta-\epsilon} Al_\eta M_\epsilon$ | 40° C. Equilibrium hydrogen pressure (MPa) | Constituent ratio (%) of crystal structure $A_5B_{19}$ | | | $A_2B_7$ | $AB_5$ |
|---|---|---|---|---|---|---|---|
| | | | $Ce_5Co_{19}$ | $Pr_5Co_{19}$ | Total | | |
| a | $La_{0.8}Ce_{0.1}Pr_{0.05}Nd_{0.05}Ni_{4.2}Al_{0.3}(Co, Mn)_{0.7}$ | 0.110 | 0 | 0 | 0 | 0 | 100 |
| b | $Nd_{0.9}Mg_{0.1}Ni_{3.2}Al_{0.2}Co_{0.1}$ | 0.052 | 6 | 0 | 6 | 93 | 1 |
| c | $La_{0.2}Pr_{0.2}Nd_{0.5}Mg_{0.1}Ni_{3.4}Al_{0.2}$ | 0.027 | 14 | 13 | 27 | 73 | 0 |
| d | $Nd_{0.9}Mg_{0.1}Ni_{3.4}Al_{0.2}(Co, Mn)_{0.1}$ | 0.102 | 34 | 6 | 40 | 56 | 4 |
| e | $Nd_{0.9}Mg_{0.1}Ni_{3.5}Al_{0.2}$ | 0.041 | 44 | 3 | 47 | 49 | 4 |
| f | $La_{0.2}Pr_{0.1}Nd_{0.5}Mg_{0.2}Ni_{3.5}Al_{0.3}$ | 0.066 | 65 | 25 | 90 | 10 | 0 |
| g | $La_{0.2}Nd_{0.7}Mg_{0.1}Ni_{3.6}Al_{0.1}Zn_{0.2}$ | 0.087 | 67 | 12 | 79 | 21 | 0 |
| h | $La_{0.2}Nd_{0.7}Mg_{0.1}Ni_{3.7}Al_{0.1}$ | 0.120 | 62 | 38 | 100 | 0 | 0 |
| i | $La_{0.5}Pr_{0.1}Nd_{0.3}Mg_{0.1}Ni_{3.7}Al_{0.2}$ | 0.054 | 74 | 11 | 85 | 4 | 11 |
| j | $La_{0.2}Nd_{0.7}Mg_{0.1}Ni_{3.7}Al_{0.1}$ | 0.180 | 77 | 9 | 86 | 11 | 3 |
| k | $La_{0.2}Nd_{0.7}Mg_{0.1}Ni_{3.8}Al_{0.1}Co_{0.1}$ | 0.220 | 30 | 4 | 34 | 7 | 59 |

From the results of the above Table 2, the following has became apparent. That is, the hydrogen storage alloys b to j consisting of a rare earth element, Ni and Mg consist of the $A_5B_{19}$-type structure and the $A_2B_7$-type structure. Further, the hydrogen storage alloys d to i having a composition containing an element R selected from the Group IV and the rare earth elements including Y and excluding La, and an element M consisting of at least one of Co, Mn, and Zn, and represented by a general formula: $La_\alpha R_{1-\alpha-\beta}Mg_\beta Ni_{\gamma-\eta-\epsilon}Al_\eta M_\epsilon$ (wherein $\alpha$, $\beta$, $\gamma$, $\eta$, $\epsilon$ satisfy numerical formulae: $0 \leq \alpha \leq 0.5$, $0.1 \leq \beta \leq 0.2$, $3.7 \leq \gamma \leq 3.9$, $0.1 \leq \eta \leq 0.3$, $0 \leq \epsilon \leq 0.2$), had the constituent ratio of the $A_5B_{19}$-type structure ($Ce_5Co_{19}$-type structure+$Pr_5Co_{19}$-type structure) of 40% or more. Further, as the hydrogen storage alloy j, AB ratio (stoichiometric ratio) ($\gamma$) is 4.0 or more and while the constituent ratio of the $A_5B_{19}$-type structure ($Ce_5Co_{19}$-type structure+$Pr_5Co_{19}$-type structure) has been lowered, the constituent ratio of the $AB_5$-type structure has remarkably raised.

2. Hydrogen Storage Alloy Electrode

Thereafter, to a water-soluble binder in which CMC (carboxymethylcellulose) was dissolved in water or pure water, 0.5% by mass of a nickel flake having an apparent density of 1.5 g/cm3 was added, and thereafter, each of the obtained hydrogen storage alloys particles (a to k) was mixed with the above resultant mixture and the resultant mixture was kneaded. Next, to the kneaded product, SBR (styrene-butadiene latex) as a non-water-soluble binder and water (or pure water) were added and mixed, and the viscosity of the resultant slurry was controlled so that the slurry density becomes 3.1 g/cm$^3$ to thereby produce hydrogen storage alloy slurry. In this case, the amount of CMC (carboxymethylcellulose) was controlled to become 0.1% by mass relative to 100 parts by mass of the hydrogen storage alloy and the amount of SBR (styrene-butadiene latex) was controlled to become 1.0% by mass relative to 100 parts by mass of the hydrogen storage alloy.

Thereafter, a negative electrode substrate composed of a Ni-plating mild steel-made porous substrate (punching metal) was prepared. The hydrogen storage alloy slurry was coated on the negative electrode substrate so that the packing density becomes 5.0 g/cm$^3$ and dried. Then the negative electrode substrate was rolled to have a specific thickness. Thereafter, the negative electrode substrate was cut to have a specific size (in this case, the surface area (minor axis length× major axis length×2) of the negative electrode is 800 cm$^2$), to thereby produce each of the hydrogen storage alloy electrodes 11 (a1 to k1).

Here, a hydrogen storage alloy electrode using a hydrogen storage alloy a was referred to as the hydrogen storage alloy electrode a1, that using a hydrogen storage alloy b was referred to as the hydrogen storage alloy electrode b1. Further, that using a hydrogen storage alloy c was referred to as the hydrogen storage alloy electrode c1, that using a hydrogen storage alloy d was referred to as the hydrogen storage alloy electrode d1, that using a hydrogen storage alloy e was referred to as the hydrogen storage alloy electrode e1, that using a hydrogen storage alloy f was referred to as the hydrogen storage alloy electrode f1, that using a hydrogen storage alloy g was referred to as the hydrogen storage alloy electrode g1, that using a hydrogen storage alloy h was referred to as the hydrogen storage alloy electrode h1. Further, that using a hydrogen storage alloy i was referred to as the hydrogen storage alloy electrode i1, that using a hydrogen storage alloy j was referred to as the hydrogen storage alloy electrode j1, and that using a hydrogen storage alloy k was referred to as the hydrogen storage alloy electrode k1.

3. Nickel Electrode

A porous nickel sintered substrate having a porosity of about 85% was immersed in a mixed solution (having a specific gravity of 1.75) of nickel nitrate and cobalt nitrate to cause a nickel salt and a cobalt salt to be retained in fine pores of the porous nickel sintered substrate. Thereafter, this porous nickel sintered substrate was immersed in a 25% by mass sodium hydroxide (NaOH) aqueous solution to convert the nickel salt and the cobalt salt into nickel hydroxide and cobalt hydroxide respectively.

Next, the porous nickel sintered substrate was thoroughly washed with water to remove the alkali solution, and was dried to thereby pack an active material containing nickel hydroxide as a main component in fine pores of the porous nickel sintered substrate. By repeating such an active material packing operation for specific times (for example, 6 times), an active material composed mainly of nickel hydroxide was packed in fine pores of the porous sintered substrate to a packed density of 2.5 g/cm$^3$. Thereafter, the porous nickel sintered substrate was dried at room temperature and was cut into a specific size to thereby produce a nickel electrode 12.

4. Nickel-hydrogen Battery

Thereafter, by using the hydrogen storage alloy electrode 11 and nickel electrode 12 produced as described above, a separator 13 composed of a polypropylene-made nonwoven cloth was interposed therebetween and the resultant electrode set was wound in a spiral shape to produce a spiral electrode group. Here, in a lower part of the thus produced spiral electrode group, a substrate exposed part 11c of the hydrogen storage alloy electrode 11 is exposed and in the upper part thereof, a substrate exposed part 12c of the nickel electrode 12 is exposed. Next, to the substrate exposed part 11c on the lower terminal face of the obtained spiral electrode group, current collector of negative electrode 14 was welded and to the substrate exposed part 12c of the nickel electrode 12 on the upper terminal face of the spiral electrode group, current collector of positive electrode 15 was welded to thereby produce an electrode.

Next, the obtained electrode body was housed in a bottomed cylinder-shaped cell can 17 (the outer face of the bottom face is a negative electrode external terminal) produced by plating nickel on iron, then the negative electrode current collector 14 was welded to the inner bottom face of the cell can 17. On the other hand, a power collecting lead part 15a extending from current collector of positive electrode 15 is welded to the bottom of safety-vent system 18 which serves also as a positive electrode terminal and to which an insulted gasket 19 is fitted to the circumference part thereof. Here, on the safety-vent system 18, a positive electrode cap 18a is provided and in the positive electrode cap 18a, a pressure valve (not shown) consisting of a valve disc 18b deformed when the pressure becomes a specific pressure and a spring 18c is arranged.

Next, in the upper circumference part of the cell can 17, a cyclic groove 17a is formed and an electrolyte is poured. On the cyclic groove 17a formed in the upper circumference part of the cell 17, the insulating gasket 19 fitted to the circumference part of the opening-sealing body 18 is placed. Thereafter, by swaging the opening edge 17b of the cell 17, a nickel-hydrogen battery 10 (A to H) is produced. In this case, in the cell can 17, an alkali electrolyte consisting of a 30% by mass potassium hydroxide (KOH) aqueous solution was poured so that the amount thereof became 2.5 g/battery capacity (Ah) (2.5 g/Ah).

Here, a battery using a hydrogen storage alloy electrode a1 was referred to as a battery A, that using a hydrogen storage alloy electrode b1 was referred to as a battery B, that using a hydrogen storage alloy electrode c1 was referred to as a battery C, that using a hydrogen storage alloy electrode d1 was referred to as a battery D, that using a hydrogen storage alloy electrode e1 was referred to as a battery E, that using a hydrogen storage alloy electrode f1 was referred to as a battery F, that using a hydrogen storage alloy electrode g1 was referred to as a battery G, that using a hydrogen storage alloy electrode h1 was referred to as a battery H, that using a hydrogen storage alloy electrode i1 was referred to as a battery I, that using a hydrogen storage alloy electrode j1 was referred to as a battery J, and that using a hydrogen storage alloy electrode k1 was referred to as a battery K.

5. Battery Test (1) Discharge Characteristic (Assist Power) Evaluation

First, by using the batteries A to K produced as described above, the battery was charged in a temperature atmosphere of 25° C. by using a charging current of 1 It to 120% of the SOC (State of Charge) and was allowed to stand still for one hour. Next, the battery was left in a temperature atmosphere of 70° C. for 24 hours and the battery was discharged in a temperature atmosphere of 45° C. by using a discharging current of 1 It to a battery voltage of 0.3 V By repeating this charge-discharge cycle for 2 cycles, each of the batteries A to K was activated.

After the completion of the activation, the battery was charged in a temperature atmosphere of 25° C. by using a charging current of 1 It to 50% of the SOC (State of Charge) and was allowed to stand still for one hour. Next, the battery was charged in a temperature atmosphere of –10° C. with an arbitrary charging rate for 20 seconds and was allowed to stand still for 30 minutes. Thereafter, the battery was discharged in a temperature atmosphere of –10° C. with an arbitrary charging rate for 10 seconds and was allowed to stand still for 30 seconds in a temperature atmosphere of 25° C. A cycle was repeated in which, in a temperature atmosphere of –10° C., the battery was charged with an arbitrary charging rate for 20 seconds, allowed to stand still for 30 minutes, discharged with an arbitrary discharging rate for 10 seconds, and in a temperature atmosphere of 25° C., the battery was allowed to stand still for 30 minutes.

In this case, the arbitrary charging rate was an charging current in such an order that 0.8 It→1.7 It→2.5 It→3.3 It→4.2 It and the arbitrary discharging rate was an discharging current in such an order that 1.7 It→3.3 It→5.0 It→6.7 It→8.3 It. At a time course of 10 seconds after the start of the discharging using each discharging rate, the battery voltage (V) of each of the batteries A to K was measured per each discharging rate respectively, so that an approximation curve of discharge V-I plot was required.

Here, a current when the battery voltage on the above-obtained approximation curve of V-I plot is 0.9 was required as a discharge power (–10° C. assist power) as a discharge characteristic index, and a relative ratio relative to the standard which is a –10° C. assist power of the battery B using the hydrogen storage alloy b was measured as a –10° C. assist power ratio (relative battery B). The results of the measurement were obtained as shown in the following Table 3. Further, the relationship between the constituent ratio of the $A_5B_{19}$-type structure and the –10° C. assist power ratio is shown in a graph as shown in FIG. 2.

(2) Corrosion Resistance Evaluation (Discharge Reserve Capacity Evaluation)

Next, the discharge reserve was evaluated as an index of the corrosion resistance of the hydrogen storage alloy. In this case, in a temperature atmosphere of 25° C., the battery was discharged using discharging current of 1 It until the discharge voltage became 0.3 V and the negative electrode discharge capacity (U1) during the discharging using 1 It was required from the discharging time. Next, the battery was allowed to stand still in a temperature atmosphere of 25° C. for 10 minutes and the battery was discharged using a discharging current of 0.1 It until the discharge voltage became 0.3 V to require the negative electrode discharge capacity (U2) during the discharging using 0.1 It from the discharging time.

Then, the sum (U1+U2) of the required negative electrode discharge capacity (U1) during the discharging using 1 It and the required negative electrode discharge capacity (U2) during the discharging using 0.1 It was required as a discharge reserve capacity . Thereafter, the ratio of the above sum relative to the battery capacity (P) was required as a discharge reserve capacity rate $(((U1+U2)/P)\times 100\%)$ and the result thereof is shown in the following FIG. 3. Further, the ratio of the –10° C. assist power ratio to the discharge reserve capacity rate (–10° C. assist power ratio/discharge reserve capacity rate) was required and the result thereof is shown in the following Table 3. Further, the relationship between the constituent ratio of the $A_5B_{19}$-type structure and the ratio of the –10° C. assist power ratio to the discharge reserve capacity rate 10° C. assist power ratio/discharge reserve capacity rate) are shown in a graph as shown in FIG. 3.

(3) Self-Discharge Characteristic Evaluation

Next, as a corrosion resistance index of the hydrogen storage alloy, the 45° C. self-discharge characteristic were evaluated. In this case, the battery was charged in a temperature atmosphere of 25° C. using a charging current of 1 It to 80% of the SOC (State of Charge) and was allowed to stand still for one hour. Next, the battery was discharged in a temperature atmosphere of 25° C. using a charging current of 1 It until the battery voltage became 0.9 V to require the residual capacity (W1) before allowing to stand still from the discharging time. Thereafter, the battery was allowed to stand still for 30 minute in a temperature atmosphere of 25° C. and then, was charged using a charging current of 1 It to 80% of the SOC (State of Charge).

Next, the battery was allowed to stand still in a temperature atmosphere 45° C. for 7 days. Thereafter, the battery was discharged in a temperature atmosphere 25° C. using a discharging current of 1 It until the battery voltage became 0.9 V to require the residual capacity (W2) after allowing to stand still from the discharging time. Then, the ratio of the residual capacity (W2) after allowing to stand still relative to the residual capacity (W1) before allowing to stand still was required as the self-discharging residual capacity rate (W2/W1×100%) and the result thereof is shown in the following Table 3.

TABLE 3

| Battery | Constituent ratio of $A_5B_{19}$-type (%) | | | 40° C. Equilibrium hydrogen pressure (MPa) | −10° C. Assist power ratio (relative to battery B) | Discharge reserve accumulated ratio (%) | −10° C. Assist power ratio/discharge reserve accumulated ratio (%) | Self-discharge residual capacity ratio (%) |
|---|---|---|---|---|---|---|---|---|
| | $Ce_5Co_{19}$ | $Pr_5Co_{19}$ | Total | | | | | |
| A | 0 | 0 | 0 | 0.110 | 98 | 51 | 1.9 | 89.3 |
| B | 6 | 0 | 6 | 0.052 | 100 | 52 | 1.9 | 89.1 |
| C | 14 | 13 | 27 | 0.027 | 104 | 58 | 1.8 | 88.5 |
| D | 34 | 6 | 40 | 0.102 | 124 | 56 | 2.2 | 89.8 |
| E | 44 | 3 | 47 | 0.041 | 120 | 50 | 2.4 | 90.3 |
| F | 65 | 25 | 90 | 0.066 | 124 | 52 | 2.4 | 89.4 |
| G | 67 | 12 | 79 | 0.087 | 131 | 50 | 2.6 | 89.3 |
| H | 62 | 38 | 100 | 0.120 | 135 | 51 | 2.6 | 86.4 |
| I | 74 | 11 | 85 | 0.054 | 129 | 46 | 2.8 | 87.5 |
| J | 77 | 9 | 86 | 0.180 | 136 | 50 | 2.7 | 86.5 |
| K | 30 | 4 | 34 | 0.220 | 120 | 71 | 1.7 | 80.3 |

As is apparent from the results shown in the above Table 3 and FIG. 2, according to the increase of the constituent ratio of the $A_5B_{19}$-type structure, the −10° C. assist power output (low temperature output) is enhanced. Further, as is apparent from the results shown in the above Table 3 and FIG. 3, the output per discharge reserve accumulated rate is remarkably enhanced when the constituent ratio of the $A_5B_{19}$-type structure is 40% or more.

On the other hand, in the battery K, since it uses the hydrogen storage alloy k having a constituent ratio of the $A_5B_{19}$-type structure of 34%, though the enhancement of the −10° C. assist power output (low temperature output) is recognized, it resulted in a large elevation of the discharge reserve accumulated rate. This is considered to be due to the increase of the constituent ratio of the $AB_5$-type structure. In other words, it is considered that the segregation phase was dissolved and oxidized, so that the discharge reserve accumulated rate was elevated. Further, it is apparent that the battery K has such a high 40° C. equilibrium hydrogen pressure as 0.220 MPa and the self-discharge residual capacity rate was lowered. This is considered to be because a hydrogen concentration on the surface of the hydrogen storage alloy is high, which contributes to a reduction reaction in the positive electrode. Thus, it can be mentioned that the 40° C. equilibrium hydrogen pressure is desirably within 0.18 MPa.

Taking the above results into account comprehensively, the followings are apparent. That is, when a hydrogen storage alloy having a composition represented by a general formula: $La_\alpha R_{1-\alpha-\beta} Mg_\beta Ni_{\gamma-\eta-\epsilon} Al_\eta M_\epsilon$ (wherein α, β, γ, η, ε satisfy numerical formulae: $0 \leq \alpha \leq 0.5$, $0.1 \leq \beta \leq 0.2$, $3.7 \leq \gamma \leq 3.9$, $0.1 \leq \eta \leq 0.3$, $0 \leq \epsilon \leq 0.2$) and containing an element R selected from the Group IV and the rare earth elements including Y and excluding La, and an element M consisting of at least one of Co, Mn, and Zn, in which the constituent ratio of the $A_5B_{19}$-type structure is 40% or more, is used, it becomes possible to enhance the −10° C. assist power (low temperature output). In this case, the $A_5B_{19}$-type structure consists preferably of at least one of a $Ce_5Co_{19}$ crystal phase and a $Pr_5Co_{19}$ crystal phase. Further, when a hydrogen content H/M (atom ratio) at 40° C. is 0.5, an equilibrium hydrogen pressure (MPa) is desirably 0.04 to 0.18 MPa.

6. Study of Thickness of Hydrogen Storage Alloy Ingot

Next, the thickness of the hydrogen storage alloy ingot was studied as follows. Here, each of metal elements was weighed so that the compositions of the hydrogen storage alloy became the hydrogen storage alloy c ($La_{0.2}Pr_{0.2}Nd_{0.5}Mg_{0.1}Ni_{3.4}Al_{0.2}$) and the hydrogen storage alloy h ($La_{0.2}Nd_{0.7}Mg_{0.1}Ni_{3.7}Al_{0.1}$), and the metal elements were mixed. Thereafter, the resultant mixture was charged into an argon gas atmosphere of the high-frequency electric induction furnace to be molten. Thereafter, the resultant molten metal was quenched to form an alloy ingot having a thickness of 10 mm to thereby produce the thin plate-shaped hydrogen storage alloy m ($La_{0.2}Pr_{0.2}Nd_{0.5}Mg_{0.1}Ni_{3.4}Al_{0.2}$) and hydrogen storage alloy n ($La_{0.2}Nd_{0.7}Mg_{0.1}Ni_{3.7}Al_{0.1}$).

Next, with respect to each of the obtained hydrogen storage alloys m, n, the melting point (Tm) was measured in substantially the same manner as described above by using a DSC (Differential Scanning Calorimeter) and the hydrogen storage alloys m, n were subjected to a heat treatment at a temperature lower than the melting point (Tm) of the hydrogen storage alloys m, n by 30° C. (Ta=Tm−30° C.) for a specific time (in this case for 12 hours). Thereafter, the blocks of the hydrogen storage alloys m, n were coarsely ground and then, were mechanically ground in an inert gas atmosphere to an average particle diameter of 25 μm to thereby produce the hydrogen storage alloy particles m, n. Next, in substantially the same manner as described above, the crystal structures of the hydrogen storage alloys m, n were identified. Next, in substantially the same manner as described above, the constituent ratio of each crystal structure was calculated to obtain the results shown in Table 4.

Next, by using the hydrogen storage alloys m, n, in substantially the same manner as described above, the hydrogen storage alloy electrodes m1, n1, as well as the nickel-hydrogen batteries M, N, were produced and were activated in substantially the same manner as described above. By subjecting these electrodes and batteries to the charge-discharge test in substantially the same manner as described above, the discharge output (−10° C. assist power) as a discharge characteristics index was required to obtain the results shown in Table 4. Here, in Table 4, also the results of the above-described battery C (battery using the hydrogen storage alloy c in the negative electrode) and battery H (battery using the hydrogen storage alloy h in the negative electrode) are shown together.

TABLE 4

| Type of Battery | Constituent ratio of crystal structure (%) | | | | | -10° C. Assist power ratio (relative to battery B) (%) |
|---|---|---|---|---|---|---|
| | $A_5B_{19}$ | | | | | |
| | $Ce_5Co_{19}$ | $Pr_5Co_{19}$ | Total | $A_2B_7$ | $AB_5$ | |
| C | 14 | 13 | 27 | 73 | 0 | 57 |
| M | 13 | 12 | 25 | 75 | 0 | 57 |
| H | 62 | 38 | 100 | 0 | 0 | 74 |
| N | 65 | 22 | 87 | 13 | 0 | 65 |

As is apparent from the results shown in the above Table 4, when the battery C and the battery M using a hydrogen storage alloy which becomes a composition represented by $La_{0.2}Pr_{0.2}Nd_{0.5}Mg_{0.1}Ni_{3.4}Al_{0.2}$ ($\gamma$ becomes 3.6) are compared to each other, it is apparent that there can be recognized no difference in the constituent ratio and output properties of the $A_5B_{19}$-type structure, between them. On the other hand, when the battery H and the battery N using a hydrogen storage alloy which becomes a composition represented by $La_{0.2}Nd_{0.7}Mg_{0.1}Ni_{3.7}Al_{0.1}$ ($\gamma$ becomes 3.8) are compared to each other, it is apparent that the constituent ratio of the $A_5B_{19}$-type structure and -10° C. assist power ratio of the battery H using a hydrogen storage alloy produced so that the thickness of the alloy ingot became 0.5 mm are more improved than those of the battery N using a hydrogen storage alloy produced so that the thickness of the alloy ingot became 10 mm.

Thus, when a hydrogen storage alloy having a composition represented by a general formula: $La_\alpha R_{1-\alpha-\beta}Mg_\beta Ni_{\gamma-\eta-\epsilon}Al_\eta M_\epsilon$ (wherein $\alpha$, $\beta$, $\gamma$, $\eta$, $\epsilon$ satisfy numerical formulae: $0 \leq \alpha \leq 0.5, 0.1 \leq \beta \leq 0.2, 3.7 \leq \gamma \leq 3.9, 0.1 \leq \eta \leq 0.3, 0 \leq \epsilon \leq 0.2$) and comprising an element R selected from the Group IV and the rare earth elements including Y and excluding La, and an element M consisting of at least one of Co, Mn, and Zn, a process for producing an alloy ingot including: heating and melting a metal element as a raw material; and producing an alloy ingot having a thickness of 0.5 mm or less, needs to be provided.

Here, after the alloy ingot has been produced, it is desired that the alloy ingot is subjected to a heating treatment at a temperature lower than the melting point of the alloy ingot by 60° C. to 30° C. This is because, when the hydrogen storage alloy is subjected to a heating treatment at a temperature lower than a temperature lower than the melting temperature thereof by 60° C., a segregation phase due to an inhomogeneous dispersion of Al or Mg is generated and the homogenization of the structure is hindered, which causes the degradation of corrosion resistance. On the other hand, the hydrogen storage alloy is subjected to a heating treatment at a temperature higher than a temperature lower than the melting temperature thereof by 30° C., a Mg fume is generated due to a low boiling point of Mg, which causes a problem in the safety during the production of the alloy.

Here, for producing a thin plate-shaped hydrogen storage alloy ingot (thin piece) having a thickness of 0.5 mm or less by quenching a molten metal produced by heating and melting a metal element as a raw material, a known cooling solidification method such as a double roll method or a single roll method may be used.

What is claimed is:

1. A hydrogen storage alloy for an alkaline battery which is used as a negative electrode active material of an alkaline battery, comprising:
    an element R selected from the Group IV and the rare earth elements including Y and excluding La; and
    an element M consisting of at least one of Co, Mn, and Zn;
    wherein the hydrogen storage alloy is represented by general formula: $La_\alpha R_{1-\alpha-\beta}Mg_\beta Ni_{\gamma-\eta-\epsilon}Al_\eta M_\epsilon$ (wherein $\alpha$, $\beta$, $\gamma$, $\eta$, $\epsilon$ satisfy numerical formula: $0 \leq \alpha \leq 0.5, 0.1 \leq \beta \leq 0.2, 3.7 \leq \gamma \leq 3.9, 0.1 \leq \eta \leq 0.3, 0 \leq \epsilon \leq 0.2$); and
    the constituent ratio of the $A_5B_{19}$-type structure is 40% or more in the crystal structure thereof.

2. The hydrogen storage alloy for an alkaline battery according to claim 1, wherein the $A_5B_{19}$-type structure comprises at least one of the $Ce_5Co_{19}$ crystal phase and the $Pr_5Co_{19}$ crystal phase.

3. The hydrogen storage alloy for an alkaline battery according to claim 1, wherein when the hydrogen content H/M (atomic ratio) of the hydrogen storage alloy at 40° C. is 0.5, the equilibrium hydrogen pressure (MPa) is 0.04 MPa to 0.18 MPa.

4. The hydrogen storage alloy for an alkaline battery according to claim 2, wherein when the hydrogen intercalated amount H/M (atomic ratio) of the hydrogen storage alloy at 40° C. is 0.5, the intercalated hydrogen equilibrium pressure (Pa) is 0.04 MPa to 0.18 MPa.

5. An alkaline battery, comprising:
    a hydrogen storage alloy electrode containing a hydrogen storage alloy for an alkaline battery, including an element R selected from the Group IV and the rare earth elements including Y and excluding La; and an element M consisting of at least one of Co, Mn, and Zn; wherein the hydrogen storage alloy is represented by general formula: $La_\alpha R_{1-\alpha-\beta}Mg_\beta Ni_{\gamma-\eta-\epsilon}Al_\eta M_\epsilon$ (wherein $\alpha$, $\beta$, $\gamma$, $\eta$, $\epsilon$ satisfy numerical formula: $0 \leq \alpha \leq 0.5, 0.1 \leq \beta \leq 0.2, 3.7 \leq \gamma \leq 3.9, 0.1 \leq \eta \leq 0.3, 0 \leq \epsilon \leq 0.2$); and the constituent ratio of the $A_5B_{19}$-type structure is 40% or more in the crystal structure thereof;
    a positive electrode;
    a separator for isolating the above both electrodes; and
    an alkali electrolyte; in cell can.

6. An alkaline battery according to claim 5, wherein the $A_5B_{19}$-type structure comprises at least one of the $Ce_5Co_{19}$ crystal phase and the $Pr_5CO_{19}$ crystal phase.

7. An alkaline battery according to claim 5, wherein when the hydrogen content H/M (atomic ratio) of the hydrogen storage alloy at 40° C. is 0.5, the equilibrium hydrogen pressure (MPa) is 0.04 MPa to 0.18 MPa.

8. An alkaline battery according to claim 6, wherein when the hydrogen content H/M (atomic ratio) of the hydrogen storage alloy at 40° C. is 0.5, the equilibrium hydrogen pressure (MPa) is 0.04 MPa to 0.18 MPa.

* * * * *